(12) United States Patent
Duda

(10) Patent No.: US 9,222,393 B2
(45) Date of Patent: Dec. 29, 2015

(54) CONICAL SUBSTRATE

(71) Applicant: Denso International America, Inc., Southfield, MI (US)

(72) Inventor: Andre Duda, Warren, MI (US)

(73) Assignee: Denso International America, Inc., Southfield, MI (US)

(*) Notice: Subject to any disclaimer, the term of this patent is extended or adjusted under 35 U.S.C. 154(b) by 159 days.

(21) Appl. No.: 13/723,309

(22) Filed: Dec. 21, 2012

(65) Prior Publication Data

US 2014/0178260 A1 Jun. 26, 2014

(51) Int. Cl.
*B01D 50/00* (2006.01)
*F01N 3/28* (2006.01)
*F01N 3/022* (2006.01)
*B01D 46/24* (2006.01)

(52) U.S. Cl.
CPC .......... *F01N 3/2892* (2013.01); *B01D 46/2422* (2013.01); *B01D 46/2455* (2013.01); *F01N 3/022* (2013.01); *F01N 3/28* (2013.01); *Y02T 10/20* (2013.01)

(58) Field of Classification Search
CPC ............ B01D 53/9454; B01D 53/9477; F01N 12/017; Y02T 10/22
USPC .................................. 422/177, 180, 176, 179
See application file for complete search history.

(56) References Cited

U.S. PATENT DOCUMENTS

| | | | | |
|---|---|---|---|---|
| 3,910,850 A | * | 10/1975 | Turner | 422/177 |
| 3,948,611 A | * | 4/1976 | Stawsky | 422/179 |
| 4,143,117 A | * | 3/1979 | Gaysert | 422/179 |
| 4,444,721 A | * | 4/1984 | Ohkata | 422/179 |
| 5,656,245 A | * | 8/1997 | Fujisawa et al. | 422/179 |
| 6,464,947 B2 | * | 10/2002 | Balland | 422/180 |
| 6,938,339 B2 | * | 9/2005 | Hughes | 29/890 |
| 2007/0178026 A1 | * | 8/2007 | Roth et al. | 422/177 |

* cited by examiner

*Primary Examiner* — Tom P Duong
(74) *Attorney, Agent, or Firm* — Harness, Dickey & Pierce, P.L.C.

(57) ABSTRACT

A catalytic converter for use in motor vehicle exhaust systems includes a housing and a catalytic substrate disposed in the housing. The housing includes a central shell fixed to an inlet end cone and an outlet end cone. The catalytic substrate includes a primary body section disposed in an internal chamber of the central shell and a secondary body section disposed in an inlet chamber of the inlet end cone. The secondary body section includes a shaped face surface that is exposed to hot exhaust gases supplied to the inlet chamber to assist in improved light-off and improved purification efficiency.

19 Claims, 4 Drawing Sheets

CONICAL SUBSTRATE

FIELD

The present disclosure relates generally to automotive catalytic converters. More particularly, the present disclosure pertains to catalytic converters having a catalytic substrate with at least one of a shaped front face surface and a shaped rear face surface.

BACKGROUND

The statements in this section merely provide background information related to the present disclosure and may not constitute prior art.

Catalytic converters are used in motor vehicles to react with and purify the hot exhaust gases discharged from an internal combustion engine. The catalytic converter typically includes a substrate, often constructed of a ceramic material, having channels or other flow conduits, such as honeycombs, for the passage of the hot exhaust gases. The substrate can be loaded with a catalyst which functions to purify the hydrocarbons (HC), carbon monoxide (CO) and nitric oxide ($NO_x$) in the exhaust gases through a catalytic reaction process.

The catalytic converter can also include a housing having a central chamber, an inlet for receiving the hot exhaust gases, and an outlet for exhausting the purified gases. In most applications, the catalytic substrate is positioned within the control chamber for performing the gas purifying function. A support member, such as a mat or wire mesh, is often wrapped around the substrate for supporting the substrate with respect to the housing. The support member can be placed between the catalytic substrate and the housing and exert a radially-directed load to inhibit movement of the catalytic substrate and absorb shock. In some catalytic converters, laterally-spaced seal members can be disposed at opposite ends of the catalytic substrate, adjacent to the inlet and outlet ends of the control chamber, to reduce leakage of untreated exhaust gases and compensate for surface irregularities on or between the substrate and/or the chamber caused by flexibility of the support member.

Typical catalytic converters include a cylindrical catalyst-coated substrate having flat inlet and outlet surfaces which tend to exhibit uneven gas flow patterns across their entire planar face surface. As such, most of the hot exhaust gases are directed to flow through a central portion of the catalytic substrate. Unfortunately, this configuration may result in reduced efficiency of the catalytic function and reduced life expectancy of the catalytic converter.

A significant portion of the undesirable emissions exhausted from a vehicle's internal combustion engine occurs during the first few minutes of engine operation following a cold start. This is due to the fact that the catalytic converter is not optimally functional until the catalytic substrate reaches its working temperature, commonly referred to as achieving "light-off". In view of stricter emissions regulations, it is critical to reduce the time it takes the catalytic converter to reach its working temperature.

Accordingly, a need exists for development of catalytic converters having quicker light-off characteristics and enhanced flow patterns through the catalytic substrate.

SUMMARY

This section provides a general summary of the present disclosure, and is not a comprehensive disclosure of its full scope or all of its features and advantages.

It is an aspect of the present disclosure to provide a catalytic converter having a catalytic substrate with a contoured inlet face surface and/or a contoured outlet face surface to promote improved light-off characteristics and enhanced conversion efficiency.

It is another aspect of the present disclosure to provide a catalytic converter having a catalytic substrate with a contoured inlet face surface to provide a sacrificial leading portion to increase longevity of the catalytic substrate.

In accordance with this and other aspects of the present disclosure, a catalytic converter is provided with a catalytic substrate having at least one of a shaped inlet face surface and a shaped outlet face surface.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected exemplary embodiments and are not intended to limit the scope of the present disclosure in any way. Similar or identical elements are given consistent reference numerals throughout the various figures.

The present disclosure will become more fully understood from the detailed description and the accompanying drawings wherein.

DETAILED DESCRIPTION

The following exemplary embodiments are provide so that the present disclosure will be thorough and fully convey the scope of those skilled in the art. Numerous specific details are set forth such as examples of specific components, devices and schematic configurations to provide a thorough understanding of exemplary embodiments of the present disclosure. However, it will be apparent to those skilled in the art that these specific details need not be employed, that the exemplary embodiments may be embodied in many different forms, and that neither should be construed to limit the scope of the present disclosure.

Figure 1:
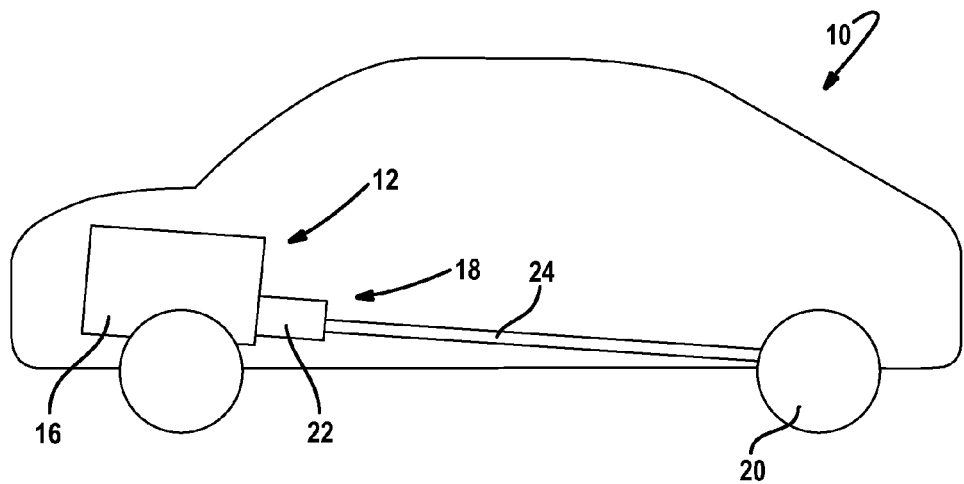
FIG. 1 is a schematic of a motor vehicle equipped with a powertrain and exhaust system constructed in accordance with the present teachings.
Figure 2:
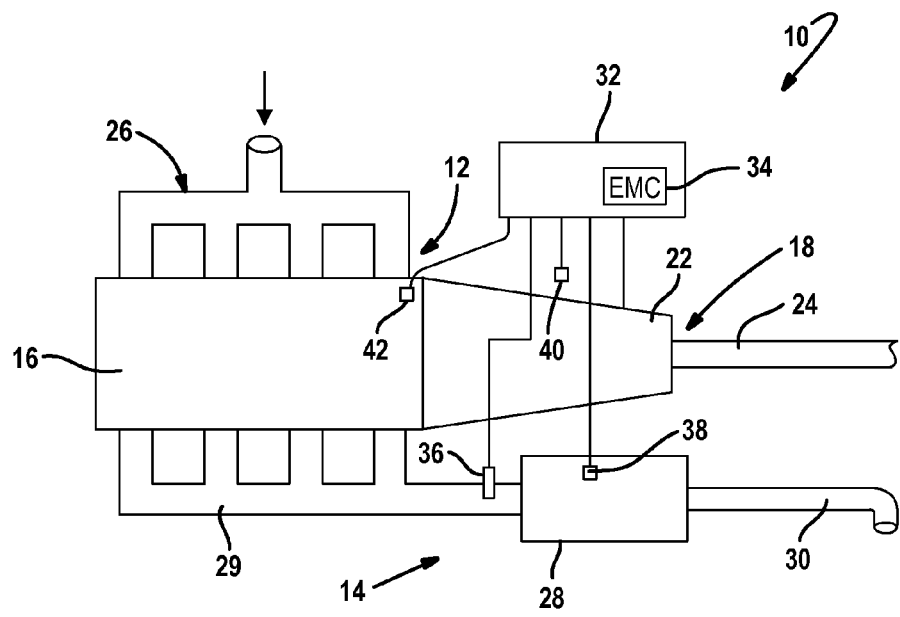
FIG. 2 is a schematic illustration of the powertrain and the exhaust system associated with the motor vehicle of FIG. 1.

Referring primarily to FIGS. 1 and 2, a motor vehicle 10 is schematically shown to include a powertrain 12 and an exhaust system 14. The powertrain 12 includes an internal combustion engine 16 and a drivetrain 18 that are configured to generate and transmit drive torque to a set of drive wheels 20. The drivetrain 18 can include a transmission 22, an axle assembly (not shown) driving the wheels 20, and a propshaft 24 interconnecting an output of the transmission 22 to an input of the axle assembly. The internal combustion engine 16 can be provided with an air intake system 26 and the exhaust system 14 can include a catalytic converter 28 having an inlet adapted to receive exhaust gases from an exhaust manifold 29 of the engine 16 and an outlet adapted to discharge the treated gases to a tail pipe 30. The catalytic converter 28 is adapted to purify the hot exhaust gases generated by the engine 16 via a catalytic conversion process. The converted or purified gases are exhausted through the tail pipe 30. The motor vehicle 10 can further include a control system 32 having an engine management controller 34 that is responsive to various sensors including, for example, a lambda probe 36, a catalytic converter temperature sensor 38, an ambient temperature sensor 40, and a crankshaft sensor 42. In accordance with an exemplary embodiment, the control system 32 is adapted to control engine operating parameters such as, for example, the ignition timing and operation of the fuel injection system.

Figure 3:
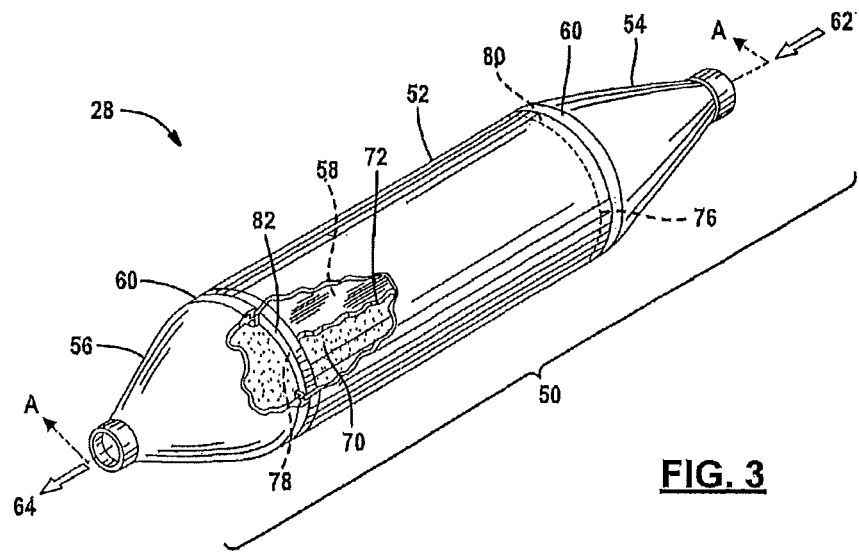
FIG. 3 is a perspective view of a catalytic converter constructed in accordance with the present invention.
Figure 4:
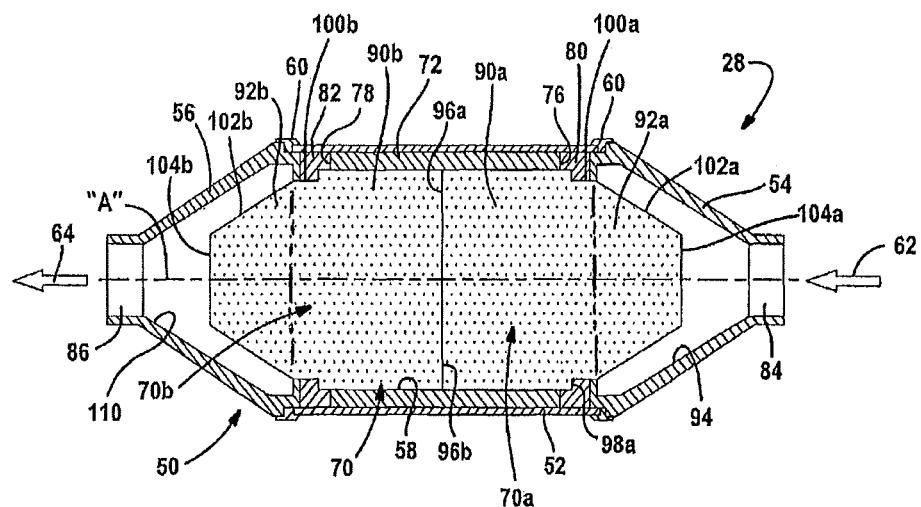
FIG. 4 is a sectional view of a catalytic converter according to a first exemplary embodiment of the present invention taken generally along A-A of FIG. 3.

Referring to FIGS. 3 and 4, a first exemplary embodiment of the catalytic converter 28 constructed in accordance with the present teachings will now be described in detail. The catalytic converter 28 can include an elongated housing 50 that can be fabricated from a sheet metal material suitable for use with hot exhaust gases and which is resistant to under-car salt and corrosion. The elongated housing 50 can include multiple sections which may be fixed (i.e., welded or riveted) together. The elongated housing 50 can include a shell 52, an inlet end cone 54 and an outlet end cone 56. In a non-limiting example, the shell 52 is shown to be generally cylindrical in shape and having a generally circular cross-section. However, it should be understood that the shell 52 can have other cross-sectional shapes, such as generally rectangular, square or oval cross-sections for use in the catalytic function.

Shell 20 defines an internal central chamber 58. The inlet and outlet end cones 54 and 56 are generally conical in shape and have a generally circular cross-section of varying diameters. It should also be understood that the end cones may have other cross-sectional shapes. Each of the end cones 54 and 56 can taper from a first larger edge perimeter to a second smaller edge perimeter. A portion of each end cone adjacent to the first larger edge perimeter is attached to a peripheral edge of the elongated shell 52 in suitable manner, for example, by welding. A bead of welding material 60 is shown applied to the end cones 54 and 56 and the shell 52 for rigidly attaching the housing components, thereby forming the multi-piece housing 50. Although not shown, inlet and outlet exhaust pipes are connected to the second smaller edge perimeters of the inlet and outlet end cones 54 and 56, respectively, to form a portion of the exhaust system 12. Hot exhaust gases may be supplied from the engine 16 to the inlet end cone 54 in a direction represented by an arrow 62 and enter the internal chamber 58. Purified gases are subsequently exhausted from the internal chamber 58 through the outlet end cone 56 in a direction represented by an arrow 64.

A catalyst-coated material, hereinafter referred to as catalytic substrate 70, is located within the internal chamber 58 of the elongated housing 50. It should be understood that one or more segments or "bricks" of the catalytic substrate 70 can be disposed axially within the chamber 58. The catalytic substrate 70 can be formed from a ceramic material impregnated with a catalyst material for performing the catalytic function in any suitable known manner when hot exhaust gases pass through the catalytic substrate 70 while flowing from the inlet end cone 54 to the outlet end cone 56.

The catalytic substrate 70 is positioned and secured within the internal central chamber 58 by a support mat 72 which is disposed within the internal chamber 58 between an inner surface of the shell 52 and an outer surface of the catalytic substrate 70. The support mat 72 prevents movement and provides support to the catalytic substrate 70 within the central chamber 58, most notably in the radial direction. The support mat 72 can be formed from an intumescent material which typically swells when exposed to hot gases so that the space between the outer surface of the catalytic substrate 70 and the inner surface of the shell 52 is occupied during operation of the catalytic converter 28. The support mat 72 can also be formed from a non-intumescent material or a wire mesh material. In other embodiments, the support mat 72 can be omitted so that a gap is formed between the facing surfaces of the catalytic substrate 70 and the shell 52. The support mat 72 can include a leading edge 76 adjacent to the inlet end cone 54 and a trailing edge 78 adjacent to the outlet end cone 56. Annular support seals 80 and 82 can also be provided between the leading edge 76 and the trailing edge 78 of the support mat 72 to provide enhanced support while restricting both radial and axial movement of the catalytic substrate 70.

Typically, the flow path upstream of the catalytic converter 26 is defined by a tube or pipe having a cross-sectional area that is substantially smaller than the cross-sectional area of the inlet end cone 54 and the internal chamber 58 within the shell 52. It can be seen from FIG. 4 that an inlet port 84 defined by the inlet end cone 54 and an outlet port 86 defined by the outlet end cone 56 are aligned along a common axis "A" and that the catalytic converter 28 is generally symmetrical relative thereto. However, this is merely illustrated as a design choice and it is to be understood that the inlet port 84 may be offset radially and/or laterally relative to the outlet port 86.

Referring primarily still to FIG. 4, a first exemplary embodiment of a contoured or "shaped" catalytic substrate 70 is shown to include an inlet brick 70a and an outlet brick 70b that are generally identical in construction but assembled in back-to-back orientation. As such, only the inlet brick 70a will be hereinafter described but the common features of the outlet brick 70b will be identified with reference numerals having a "b" suffix. The inlet brick 70a includes a first or primary body section 90a disposed within the internal central chamber 58 of the shell housing 52 and a second or secondary body section 92a disposed to extend into an inlet chamber 94 associated with the inlet end cone 54. The primary body section 90a of the inlet brick 70a is cylindrical and is supported by the mat 72 and can include a distal end surface 96a and a proximal end surface 98a. The distal end 96a of the inlet brick 70a can abut the distal end surface 96b of the outlet brick 70b or can be axially offset therefrom. The proximal end surface 98a of the inlet brick 70a is shown to be in direct contact with one side of the seal ring 80 and a radially inward extending flange formed on a terminal end of the inlet end cone 54 is in direct contact with an opposite side of seal ring 80.

The secondary body section 92a of the inlet brick 70a extends axially from the proximal end surface 98a of the primary body section 90a and is symmetrically configured relative to axis "A" to define a truncated frusto-conical shape. The truncated frusto-conical shape is defined by a cylindrical surface 100a that is surrounded by the seal ring 80, a conical inlet face surface 102a and a transverse inlet face surface 104a. As illustrated in FIG. 4, cylindrical surface 100a is parallel to and has a diameter that is smaller than an outer cylindrical surface of primary body section 90a which is supported by mat 72. The inlet face surfaces 102a and 104a are the first surfaces of the inlet brick 70a to contact a flow of heated exhaust gases within the inlet chamber 94. The conical inlet face surface 102a is operable to disperse the hot exhaust gases within the inlet chamber 94. This "shaped" surface area of the catalytic substrate 70 is advantageous since it promotes quicker "light-off" and improved gas purification. In addition, since the secondary body section 92b of the outlet brick 70b extends axially into an outlet chamber 110 formed in the outlet end cone 56, the exhaust gases are exposed to an additional volume of the catalytic substrate 70. Furthermore, it will be appreciated that the catalytic substrate 70 can be formed as a single brick instead of a pair of bricks 70a,70b. In such an arrangement, the catalytic substrate 70 would include a central primary body section, an inlet body section 92a extending into the inlet chamber 94, and an outlet body section 92b extending into the outlet chamber 110. As a further alternative, a multiple brick assembly can be used which includes a single central cylindrical brick (combining body sections 90a and 90b) and a pair of frusto-conical end bricks configured generally similar to the secondary body sections 92a and 92b.

Figure 5:
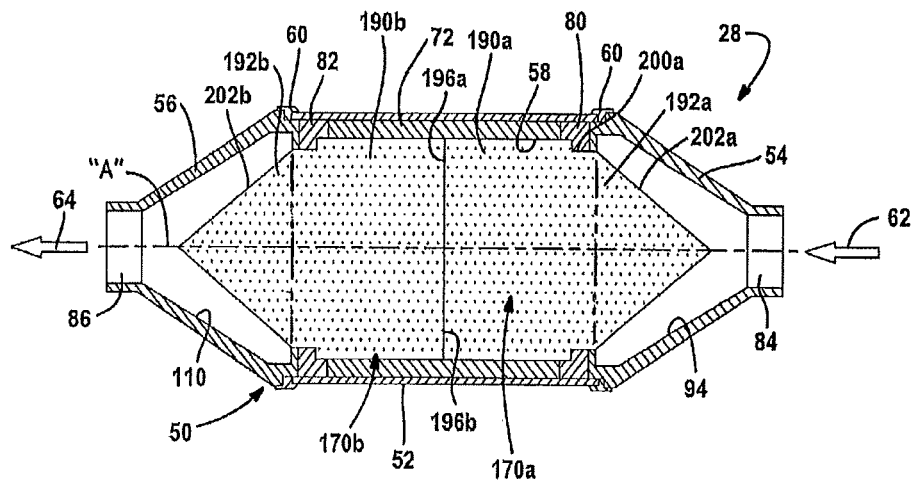
FIGS. 5 through 7 are sectional views of catalytic converters according to alternative exemplary embodiments of the present invention.

Referring to FIG. 5, a second exemplary embodiment of a "shaped" catalytic substrate 170 is shown to include an inlet brick 170a and an outlet brick 170b that are generally identical in construction but assembled in back-to-back orientation. Inlet brick 170a includes a primary body section 190a that is disposed within the internal chamber 58 and surrounded by the support member 72, and a secondary body section 192a that extends into the inlet chamber 94 of the inlet end cone 54. The primary body section 190a of the inlet brick 170a is generally cylindrical and can include a distal end surface 196a and a proximal end surface 198a. The distal end surface 196a can abut or be axially offset relative to the distal end surface 196b of the outlet brick 170b. The secondary body section 192a extends axially from the proximal end surface 198a and is configured as a right cone that is symmetrical relative to axis A. The secondary body section 192a defines a conical inlet surface 202a that is exposed to the unpurified hot exhaust gases delivered to the inlet chamber 94. As mentioned previously, the catalytic substrate 170 can be formed as a single brick having a pair of conical end face surfaces 202a and 202b or, in the alternative, as a multi-brick assembly having one or more cylindrical central bricks and a pair of end bricks each having the conical face surfaces 202a and 202b (illustrated in phantom in FIG. 5).

Figure 6:
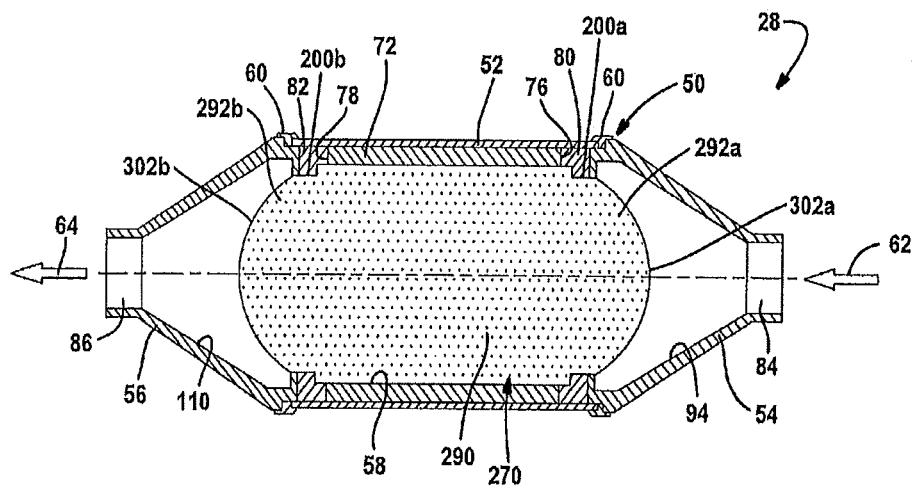

FIG. 6 illustrates another exemplary embodiment of a catalytic converter 28 equipped with a shaped catalytic substrate 270. The catalytic substrate 270 is shown to include a central body section 290 and a pair of shaped end section 292a and 292b. The central body section 290 is retained within the internal chamber 58 while the shaped end sections 292a and 292b extend axially into the inlet chamber 94 of the inlet end cone 54 and the outlet chamber 110 of the outlet end cone 56. The end sections 292a and 292b are configured to have arcuate face surfaces 302a and 302b, respectively that define spherical configurations. While the arcuate face surfaces 302a, 302b are shown to have origins aligned with the "A" axis, it is contemplated that the spherical face surfaces can be offset laterally relative to each other and/or to the "A axis.

Figure 7:
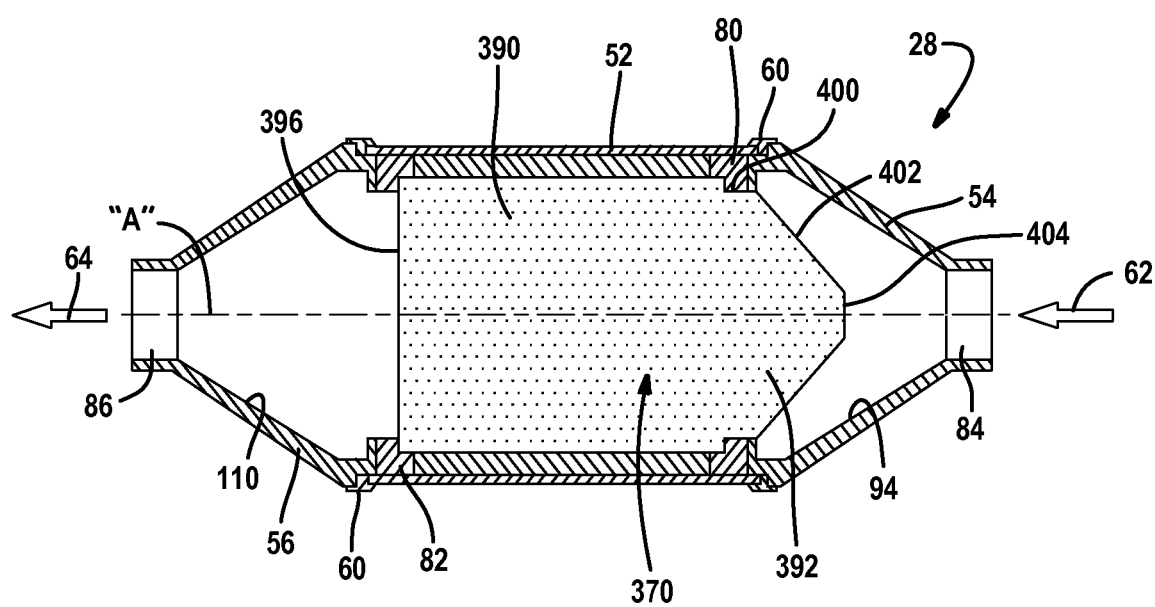

Referring to FIG. 7, another exemplary embodiment of a catalytic converter 28 is shown to be equipped with a shaped catalytic substrate 370 having a cylindrical primary body section 390 and a frusto-conical secondary body section 392. The primary body section 390 is enclosed by the support member 72 and is disposed with the internal chamber 58 while the secondary body section 392 extends axially into the inlet chamber 94. As seen, the primary body section 390 has a distal end surface 396 aligned with the outlet chamber 110 and the secondary body section 392 includes a cylindrical surface 400, a planar face surface 404, and a conical face surface 402 which interconnects the cylindrical surface 400 and the planar face surface 404. While shown as having a frusto-conically-shaped inlet face surface 402, it is understood that the secondary body section 392 can have an outer surface that is shaped in any manner which functions to extend additional brick material into the inlet chamber 94.

While various exemplary embodiments of a catalytic substrate adapted for use with automotive catalytic converters have been disclosed to include shaped face surfaces associate with at least one of the inlet face surface and the outlet face surface, it will be recognized and appreciated that additional geometric shapes are fully within the scope of this invention. For example, the outer periphery of the face surface can be configured as a regular polygon (i.e., pentagon, hexagon, heptagon, etc.), as an oblique prism or cone, and/or as a curved surface (i.e., sphere, ellipsoid, paraoloid, etc.). In each instance, the purpose of the "shaped" face surface is to increase the surface area of catalytic material disposed within the inlet chamber and which is exposed to the untreated exhaust gases.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A catalytic converter for purifying exhaust gas from an engine, comprising:
   a housing defining an inlet chamber for receiving the exhaust gas, a central internal chamber communicating with the inlet chamber, and an outlet chamber communicating with the central internal chamber for exhausting the purified gas;
   a catalytic substrate having a first body section disposed within said central chamber and a second body section disposed within said inlet chamber, said second body section having a contoured inlet face surface; and
   a seal ring disposed between said second body section and said housing, said seal ring prohibiting the exhaust gas from flowing between said second body section and said housing; wherein
   said first body section defines a first cylindrical surface and said second body section defines a second cylindrical surface, said second cylindrical surface extending axially from a proximal end surface of said first body section and being parallel to said first cylindrical surface and having a diameter less than said first cylindrical surface;
   said seal ring directly engaging said first cylindrical surface and directly engaging said second cylindrical surface;
   the housing includes an inlet end cone defining said inlet chamber; and
   said inlet cone end defines a radially inward extending flange in direct contact with said seal ring, the radially inward extending flange extending radially inward from a terminal end of the inlet end cone.

2. The catalytic converter of claim 1 wherein said housing includes a shell defining said central chamber;
   said inlet end cone is secured to one end of said shell to define said inlet chamber,
   said housing further includes an outlet end cone secured to an opposite end of said shell to define said outlet chamber,
   said inlet end cone has an inlet port for receiving the exhaust gas from the engine, said outlet end cone has an outlet port for exhausting the purified gas to a tail pipe, and said second body section of said catalytic substrate extends into said inlet chamber toward said inlet port.

3. The catalytic converter of claim 2 wherein said contoured inlet face surface on said second body section of said catalytic substrate includes a conical face surface.

4. The catalytic converter of claim 3 wherein said conical face surface is truncated by a transversely extending face surface that is generally aligned with said inlet port.

5. The catalytic converter of claim 2 wherein said contoured inlet face surface on said second body section of said catalytic substrate is arcuate and defines a partial spherical second body section.

6. The catalytic converter of claim 2 wherein said catalytic substrate further includes a third body section disposed within said outlet chamber and which has a contoured outlet face surface.

7. The catalytic converter of claim 6 wherein said inlet face surface and said outlet face surface are conical.

8. The catalytic converter of claim 7 wherein said conical inlet face and said conical outlet face surface are symmetrical relative to an axis passing through said inlet port and said outlet port.

9. The catalytic converter of claim 6 wherein said inlet face surface and said outlet face surface are arcuate and define partially spherical second and third body sections.

10. The catalytic converter of claim 6 wherein said catalytic substrate is divided into a first brick and a second brick aligned generally adjacent to each other, wherein said first brick defines said second body section which extends into said inlet chamber, and wherein said second brick defines said third body section which extends into said outlet chamber.

11. A catalytic converter for purifying exhaust gases from an engine, comprising:
   a housing having a shell, an inlet end cone extending from a first end of said shell, and an outlet end cone extending from a second end of said shell, said inlet end cone defining an inlet port for receiving the exhaust gas and an inlet chamber communicating with said inlet port, said shell defining a central chamber communicating with said inlet chamber, said outlet end cone defining an outlet chamber communicating with said central chamber and an outlet port for exhausting the purified gases;
   a catalytic substrate having a first body section disposed within said central chamber and a second body section disposed within said inlet chamber, wherein said second body section includes a contoured inlet face surface extending toward said inlet port; and
   a seal ring disposed between said second body section and said housing, said seal ring prohibiting the exhaust gas from flowing between said second body section and said housing; wherein
   said first body section defines a first cylindrical surface and said second body section defines a second cylindrical surface, said second cylindrical surface extending axially from a proximal end surface of said first body section and being parallel to said first cylindrical surface and having a diameter less than said first cylindrical surface;
   said seal ring directly engaging said first cylindrical surface and directly engaging said second cylindrical surface; and
   said inlet cone end defines a radially inward extending flange in direct contact with said seal ring, the radially inward extending flange extending radially inward from a terminal end of the inlet end cone.

12. The catalytic converter of claim 11 wherein said contoured inlet face surface on said second body section of said catalytic substrate includes a conical face surface.

13. The catalytic converter of claim 12 wherein said conical inlet face surface is truncated by a transversely extending face surface that is generally aligned with said inlet port.

14. The catalytic converter of claim 11 wherein said contoured inlet face surface on said second body section of said catalytic substrate is arcuate and defines a partial spherical second body section.

15. The catalytic converter of claim 11 wherein said catalytic substrate further includes a third body section disposed within said outlet chamber and which has contoured outlet face surface.

16. The catalytic converter of claim 15 wherein said inlet face surface and said outlet face surface are conical.

17. The catalytic converter of claim 16 wherein said conical inlet face surface and said conical outlet face surface are symmetrical relative to an axis passing through said inlet port and said outlet port.

18. The catalytic converter of claim 15 wherein said inlet face surface and said outlet face surface are arcuate and define partially spherical second and third body sections.

19. The catalytic converter of claim 11 wherein said catalytic substrate is divided into a first brick and a second brick aligned generally adjacent to each other, wherein said first brick defines said second body section which extends into said inlet chamber, and wherein said second brick defines said third body section which extends into said outlet chamber.

* * * * *